United States Patent [19]

Durand

[11] 4,023,409

[45] May 17, 1977

[54] DEVICE FOR MEASUREMENT OF THE SPEED OF A HELICOPTER

[75] Inventor: Bernard Marie Durand, Salon, France

[73] Assignee: Etat Francais, Paris, France

[22] Filed: Aug. 15, 1975

[21] Appl. No.: 605,179

[30] Foreign Application Priority Data

Aug. 22, 1974 France .............................. 74.28786

[52] U.S. Cl. .......................... 73/178 H; 244/17.13
[51] Int. Cl.² ........................................ G01C 21/10
[58] Field of Search ......................... 73/178 H, 181; 244/17.13, 17.27, 191, 182, 178

[56] References Cited

UNITED STATES PATENTS

| 2,371,626 | 3/1945 | Kecskemeti | 73/503 |
| 2,871,699 | 2/1959 | Kenyon | 73/178 H |
| 3,711,042 | 1/1973 | Rempfer | 244/17.13 |

*Primary Examiner*—Donald O. Woodiel

*Attorney, Agent, or Firm*—Larson, Taylor and Hinds

[57] ABSTRACT

Apparatus for measurement of the velocity of a helicopter with reference to the air comprises two measurement systems that are substantially identical, associated with a double indicator. The measurements are effected with reference to the longitudinal axis and the transverse axis of the helicopter. Each measurement system comprises a position detector for detecting the position of the cyclic rotor pitch command member along one axis, and a detector of the acceleration component along the same axis, with a substantially identical measurement system associated with the other axis. Computing means effect integration of the algebraic sum of the measured values, and pass signals to the double indicator which indicates velocity of the helicopter along the axes. The acceleration detectors include pendular levels, and all detectors incorporate measurement potentiometers. The apparatus is especially useful in the measurement of the air speed of a helicopter close to hovering conditions.

10 Claims, 6 Drawing Figures

DEVICE FOR MEASUREMENT OF THE SPEED OF A HELICOPTER

FIELD OF THE INVENTION

The present invention relates to a device for measuring the air speed of a helicopter, especially when it is close to its hovering mode.

BACKGROUND AND SUMMARY

Devices are known for measuring the speed of a helicopter in the above condition, but these devices present various drawbacks. Probes generally used for measuring dynamic pressure due to the movement of the helicopter with reference to the air, and for comparing this dynamic pressure with the static ambient air, are usually not very accurate at the low dynamic pressures corresponding to the low velocities that are to be measured. Besides, unless complex facilities are used that are prohibitory outside a specialized test center, such aerodynamic pressure probes do not make it possible to take into account an orientation velocity of any kind, especially backward or sideways. This wide orientation of movement with reference to the air is precisely one of the essential peculiarities of the helicopter.

To resolve the problems that have been indicated, French patent 1,567,128 in the name of the inventor has already proposed installation below the rotor in the jet flow thereof, a system of two vanes with their axes of articulation substantially horizontal, and oriented respectively along the longitudinal axis and along the transverse axis of the helicopter. This system gives general satisfaction but has some drawbacks and limitations, especially for standardized helicopters intended to be operated with the minimum of constraints in maneuvering and maintenance. In fact, the external disposition of the vanes and their fragility impose precautions and limitations in use, and frequent burdensome checks. Moveover there has to be readjustment of the vanes for each centering value of the helicopter corresponding to a different flight attitude. Besides, since indications furnished by the vanes lack precision beyond the rather homogeneous central part of the rotor jet flow, practical use of this system is limited to low air velocities.

The purpose of the invention is to alleviate these difficulties and limitations, making possible a device for measuring helicopter air speed, especially close to the hovering mode, such that it will be independent of centering and can cover an extended range of speeds without presenting means external to the helicopter fuselage.

The invention proposes a device for measuring, especially advantageous close to the stationary flight mode with reference to the ground, the velocity of a helicopter with reference to the air, the helicopter having at least one lift rotor and a system for cyclic command of the rotor pitch, maneuvered by means of a piloting control column, the device comprising two substantially identical measurement systems associated with a double indicator and corresponding respectively to the movement of the helicopter along its longitudinal and transverse axes.

According to the invention, the above device is characterized in that each of the measurement systems comprises a first detector of the position of the cyclic rotor pitch command along the axis in question, and a second detector of the component of acceleration along the same axis, computing means being provided, assoicated with the said detectors, to effect, with reference to each of the said axes, the integration of the algebraic sum of the values measured by two corresponding detectors.

In the theory of helicopter flight stability, it is shown that the amplitude of displacement of the cyclic control of the rotor along one of the axes of reference, whether longitudinal or transverse, is the sum of a value that is in proportion to the fuselage trim in the vertical plane referred to the axis in question, and another value that is in proporation to the velocity component along the same axis, for a substantially constant rotor running operation. Because of this proposition, the device of the invention makes it possible to obtain the velocity value conveniently, making use only of means internal to the helicopter fuselage, as explained below.

In a preferred embodiment of the invention, for a helicopter equipped with servo controls of cyclic variation of the rotor pitch, the two detectors of position of the rotor controls are mounted between the latter and the servo controls, each including means for adjustment with reference to a zero position. Preferably each acceleration detector has a pendular level and reset means to adjust the pendular level with respect to a reference axis, each of said detectors including a measurement potentiometer.

Advantageously, coupling means are likewise provided between the detectors of position of the rotor command of each measurement system on the one hand, and the output of the computing means of the other system, to compensate variation of the position of the rotor command assocaited with the respective measurement systems under the influence of variation of the velocity component measured by the other system.

As explained below, the arrangements that have just been indicated make it possible to develop a sensitive accurate measurement device, in a fairly wide range of speeds, on helicopters of considerable weight.

Other features and advantages of the invention will become evident from the description of embodiments of the invention, presented as non limitative examples, with reference to the attached drawings.

DESCRIPTION OF THE DRAWINGS

FIG. 6, analogous to the lefthand part of FIG. 4, shows a variant of the installation of detectors of the cyclic pitch controls of the rotor.

DESCRIPTION OF PREFERRED EMBODIMENTS

Figure 1:
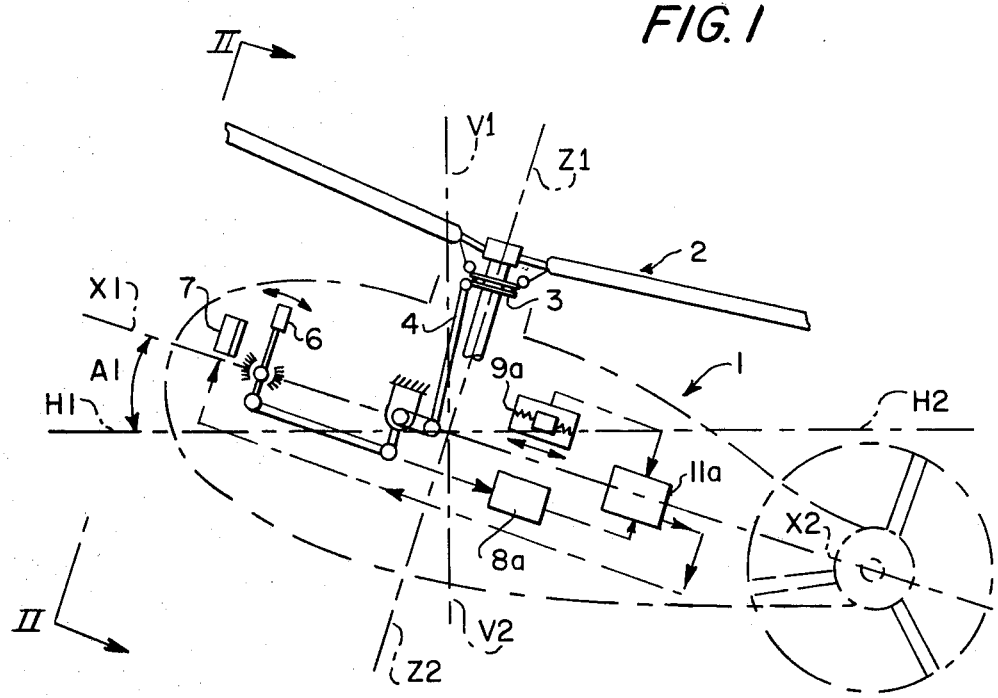
FIG. 1 is a schematic elevation in longitudinal section of a helicopter with a measurement device according to the invention.
Figure 2:
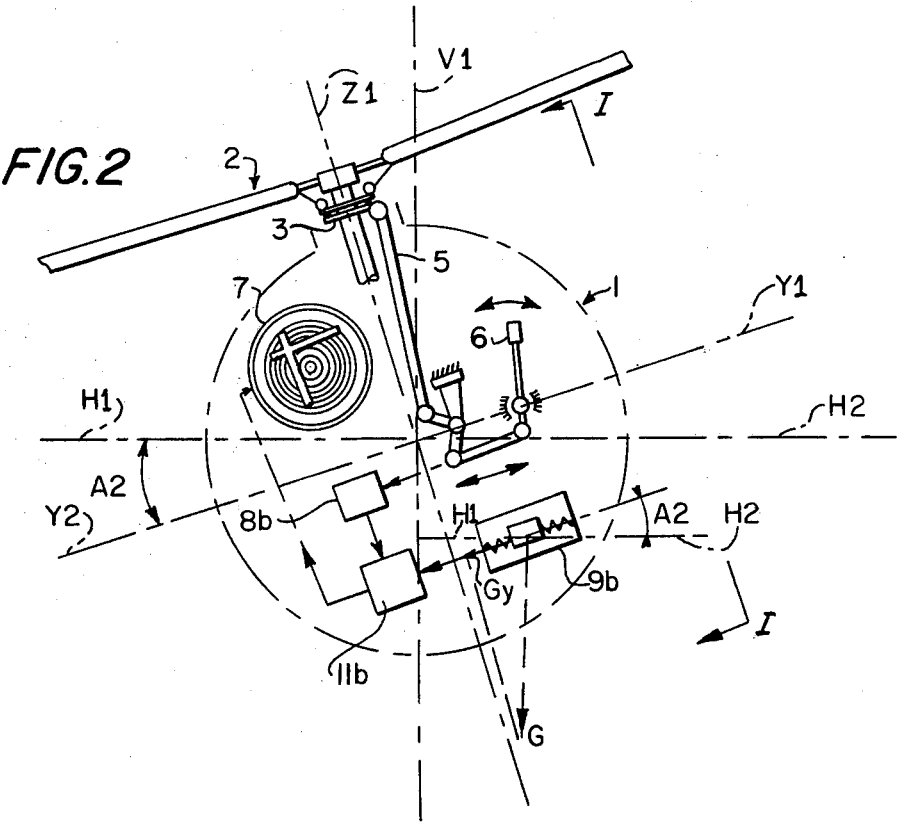
FIG. 2 is a transverse section along II-II of FIG. 1.

In the schematic embodiment of FIG. 1 and 2, the helicoptor equipped with the velocity measurement device of the invention comprises a fuselage 1 to which there is connected a lift rotor 2. Rotor 2 has a command system for cyclic pitch variation, constituted essentially by a double oscillating plate 3, whose lower part is cardan-mounted (universal joint) on fuselage 1 and subject to the action of two links, 4, 5 substantially parallel to axis Z1-Z2 of rotor 2. Link 4 called the longitudinal drive rod, is substantially situated in the plane that passes through axis Z1-Z2 of the rotor and longitudinal axis X1-X2 of fuselage 1. Link 5, called the transverse drive rod, is situated substantially in a plane perpendicular to the former, defined by axis Z1-Z2 of the rotor and transverse axis Y1-Y2 of the fuselage. The two links 4, 5 are maneuvered by means of a piloting control column 6.

The device for measurement, of the type envisioned by the invention, comprises two measurement systems, substantially identical, associated with a double indicator 7 at the disposition of the pilot and respectively corresponding to the velocity component of the helicopter along longitudinal axis X1-X2 and along transverse axis Y1-Y2. As contrasted with other types of aircraft, the helicopter can assume a velocity oriented in any way in the plane defined by the two mentioned axes, the object of the invention being, as has been seen, to allow convenient measurement of such a velocity.

According to the invention, the mentioned device comprises, for each of the measurement systems, a first detector 8a or 8b of the position of the rotor command along the axis in question, and a second detector 9a or 9b of the acceleration component along the same axis. In the longitudinal direction, defined by axis X1-X2 (FIG. 2), the measurement device comprises a first detector 8a of the position of command rod 4, and a second detector 9a of the component of acceleration of the helicopter along axis X1-X2.

In the transverse direction, defined by axis Y1-Y2 (FIG. 2), the measurement device comprises another position detector 8b, associated with transverse rod 5, and another detector of acceleration 9b, disposed along axis Y1-Y2.

Computing means are provided, assoicated with the above detectors, to effect, with reference to each of axes X1-X2 and Y1-Y2, integration as a function of time of the algebraic sum of the values measured respectively by the two detectors corresponding to the respective axis of reference. The modalities of this double operation are explained below, with reference to a specific embodiment.

In the longitudinal direction (FIG. 1), the computing means comprise an integrator block 11a that receives from detectors 8a, 9a signals that translate the values measured by these detectors. In the transverse direction (FIG. 2) an integrator block 11b is assoicated in the same way with detectors 8b, 9b. An example of the internal arrangement of integrator blocks 11a, 11b is presented below. For example, by means of electric voltages transmitted by appropriate lines, these blocks actuate sensitive elements of double indicator 7 (FIGS. 1, 2 and 3), which can comprise two crossedbars, each movable with reference to a median position, to represent the algebraic values of each component of the velocity, along reference axes X1-X2, and Y1-Y2.

Figure 3:
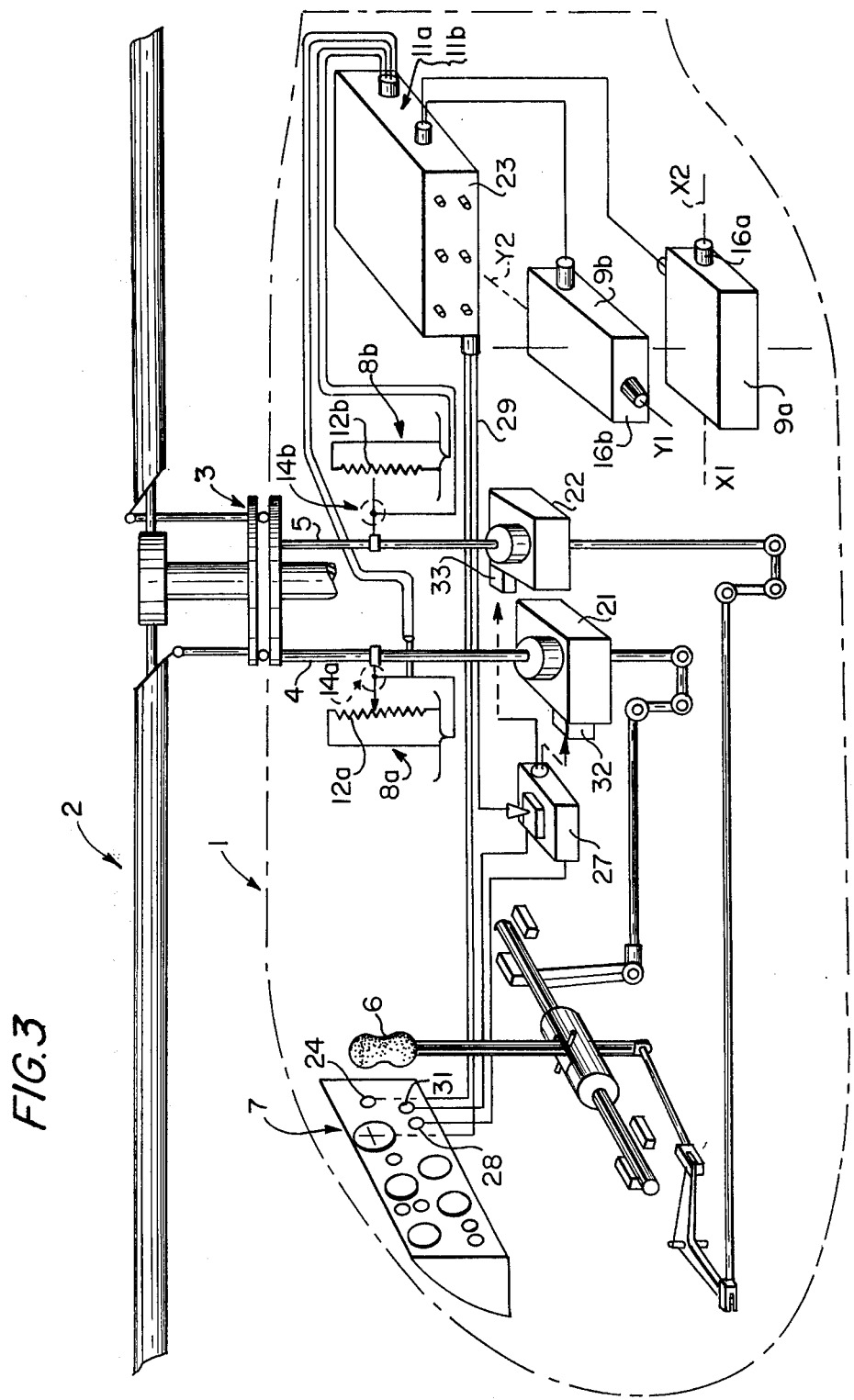
FIG. 3, analogous to FIG. 1, shows installation of the measurement device on a helicopter equipped with rotor servo controls.
Figure 4:
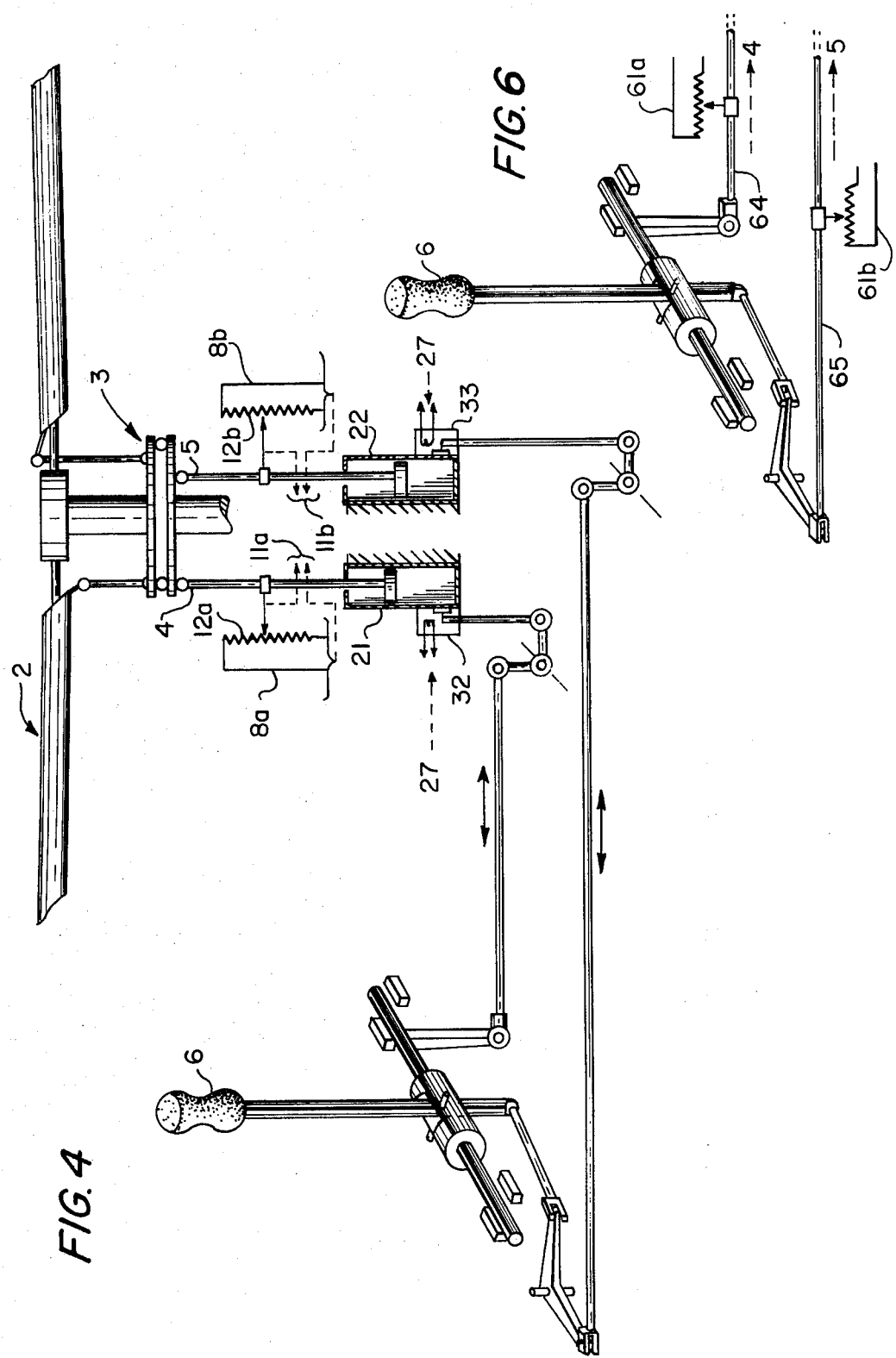
FIG. 4 is a schema of the servo controls of FIG. 3 and of the associated detectors.
Figure 5:
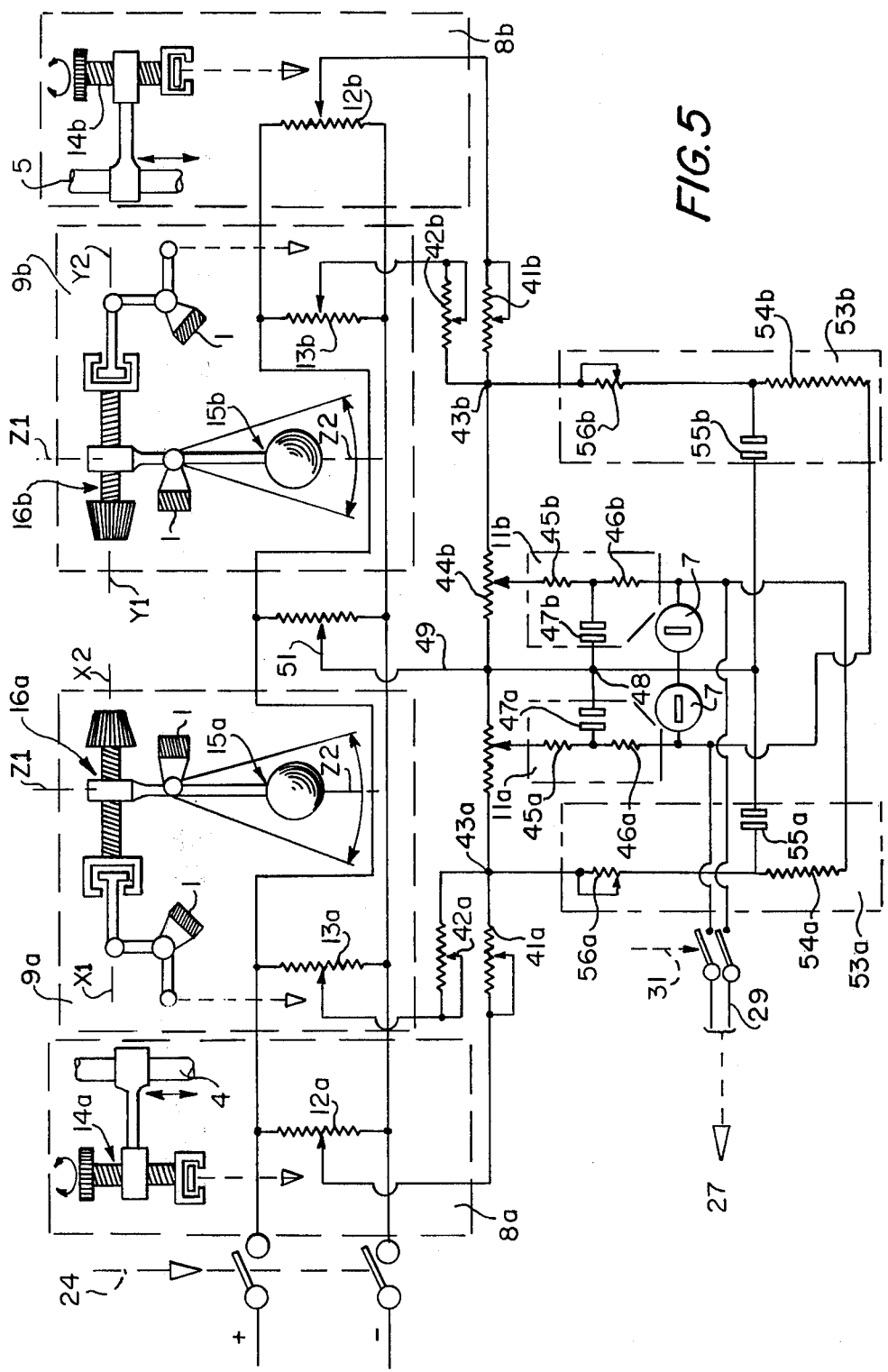
FIG. 5 is a schema of the circuits of the measurement device of FIGS. 3 and 4.

In the industrial embodiment represented in FIGS. 3 to 5, detectors 8a, 9b, and 9a, 9b each comprise a measurement potentiometer 12a, 12b (FIGS. 3-5) and 13a, 13b (FIG.5). On each detector 8a, 8b for detection of the position of the controls of rotor 2, regulating means 14a 14b (FIGS. 3 and 5) are provided, with reference to a "zero" position of each rod 4, 5. The"zero" positions of rods 4, 5 correspond to specific conditions of centering and load of the helicopter, for a specific running operation [flight].

The acceleration detectors 9a, 9b each preferably have a level pendulum 15a, 15b (FIG. 5)and means 16a, 16b for resetting, to adjust the position of respective pendulums 15a, 15b with respect to a reference axis. Conveniently, the reference axis of each pendulum is parallel to axis Z1-Z2 of rotor 2. Thus the two pendumums 15a, 15b are each mobile in a plane defined by axis Z1-Z2 and one of the axes X1-X2 and Y1-Y2.

Rotor 2 comprises servo commands 21, 22, assoicated with rods 4, 5 (FIG. 3), on which there are mounted the two position detectors 8a, 8b between oscillating plate 3 and servo commands 21, 22. Integrator blocks 11a, 11b are contained in a common casing 23 (FIG. 3) with other circuits described below. A command button 24 (FIGS. 3 and 5) disposed on the display panel allows the pilot to start the measuring device.

The helicopter has an automatic pilot 27, put into operation by a switch 28. To command the automatic pilot 27, integratorblocks 11a, 11b can develop signals for example in the form of electric voltages transmitted to the automatic pilot by a special line 29 controlled by a switch 31. In a known way, the automatic pilot 27 acts on servo commands 21, 22 for example by means of electro valves 32, 33 (FIG. 4) assocaited with a pressurized fluid circuit (not shown).

In FIG. 5 there is shown the schema of a practical embodiment of the position detectors 8a, 8b, the acceleration detectors 9a, 9b, their regulating means 14a, 14b and 16a, 16b, integrator blocks 11a, 11b, as well as the associated circuits corresponding to the arrangement of FIG. 3.

Position detectors 8a, 8b each present a connecting finger fixed rigidly to rods 4, 5 and ending on the slides of measurement potentiometers 12a, 12b, by means of a set screw 14a, 14b. In the arrangement here described by way of example, supply is assured, of a direct current with 30 volts (switch 24), and the resistors of potentiometers 12a, 12b each have a valve of 1,000 ohm. The sensitivity of detectors 8a, 8b can be regulated by means of auxiliary potentiometers 41a, 41b, of 20,000 ohms each.

The pendular levels 15a, 15b each has clearance limit (degree of swing) of 20° more or less, and precision of the order of 0.1°. Their resetting means 16a, 16b and their measurementpotentiometers 13a, 13b are designed for the same precision.The resetting means each comprises a screw device analogous to that of corrections 14a, 14b. The measurement potentiometers 13a, 13b each have a resistivity of 1,000 ohms, and an auxiliary potentiometer 42a, 42b for adjusting the sensitivity, with resistivity of 20,000 ohms.

The outputs of regulating potentiometers 41a, 43a and 41b, 42b end respectively at common points 43a, 43b, allowing algebraic addition of the values measured by detectors 82, 9a, acting along longitudinal axis X1-X2, and by detectors 8b, 9b, acting along transverse axis Y1-Y2. The common points 43a, 43b are connected to the integrator blocks 11a, 11b via regulating potentiometers 44a, 44b, with 5,000 ohms. These regulating potentiometers serve to modify the sensitivity of each of the parts of the double indicator 7, mounted at the outputs of integrator blocks 11a, 11b.

These integrators respectively have a summary integration circuit constituted by two resistors in series 45a, 46a and 45b, 46b, 10,000 ohms each, and a 500 microfarad capacitor 47a, 47b. Capacitors 47a, 47b are mounted in derivation on the common point of each pair of resistors, and joined at a common point 48 to a collector 49 associated with a regulating potentiometer 51, of 100 ohms. This potentiometer serves to define the reference potential of the two measuring systems which are symmetrical with reference to common collector 49. A circuit such as that of each of the integrator blocks 11a, 11b, allows collection at the terminals of each capacitor 47a, 47b, the rapidly varying integral of an input signal.

The outputs of integrator blocks 11a, 11b are connected to the sensitive elements of each part of indicators 7, which present a resistivity of 1,000 ohms and are provided for an intensity of 150 microamps with full deflection.

The outputs of integrator blocks 11a, 11b are also connected to double line 29, controlled by switch 31, to supply automatic pilot 27.

In combination with the circuits that have been described, each of the measurement systems comprises another circuit 53a, 53b, called the "control column stop corrector" to compensate in each measurement system the variation of the position of rod 4, 5 of the rotor, under the effect of possible variation of the component of velocity measured by the other system. For this, corrector circuits 53a, 53b comprise means for coupling between position detector 8a, 8b on the one hand, of rotor drive rods 4, 5 of the respective measurement systems, and on the other hand, the output of integrator block 11b, 11a of the other system.

In the embodiment described here by way of example, the above coupling means are constituted in each system by a resistor 54a, 54b, 50,000 ohms, in series on the connection concerned, and a capacitor 55a, 55b, branched between resistor 54a, 54b and the associated detector 8a, 8b. Corrections 53a, 53b further comprise respectively a regulating potentiometer 56a, 56b, 50,000 ohms, which allows adjustment of the coupling.

On a surface of case 23 (FIG. 3) there are schematically shown the buttons that correspond to the various potentiometers and the mechanical regulating means illustrated in FIG. 5.

The operation of the described measurement device will now be explained.

When the helicopter is in flight (FIGS. 1, 2, 3) maneuvered by means of piloting control column 6, each of thedetectors 8a, 8b of the control position measures the movement of a rod 4, 5. Similarly, each of the acceleration detectors 9a, 9b measures the acceleration component respectively along longitudinal axis X1-X2 and transverse axis Y1-Y2. In each system assoicated with one of the above axes, the algebraic sum of the values measured by the two detectors 8a, 9a and 8b, 9b is produced at the common output point 43a, 43b of the said detectors. The integration of this algebraic sum is effected in integrator block 11a, 11b whose output governs the movement of the corresponding sensitive part of double indicator 7. Automatic pilot 27 may also be commanded at the same time by the output signals of the integrator blocks, via line 29 controlled by switch 31.

According to the theory of the stability of the helicopter in flight, the amplitude of displacement of cyclic control 4, 5 of rotor 2 (FIGS. 1 and 2) along longitudinal reference axis X1-X2, transverse axis Y1-Y2, is the sum of a value that is in proportion to trim A1, A2 of the fuselage in the vertical plane with reference to the axis in question, and of another value that is in proportion to the velocity component along the same axis, for a substantially constant running or rotor 2.

In measurement of the variations of an acceleration component G, for example Gy along transverse axis Y1-Y2 (FIG. 2), in conditions rather close to those of hovering, the measurement practically is that of the variations of the sine of the transverse trim A2. In fact, in the cited conditions, the weight is largely preponderant with respect to the other accelerations that may result from the movements of the helicopter or from gusts.

The variations that are measured by acceleration detector 9b are worked up in integrater block 11b, whose output is practically independent of the input variations that occur in a small interval with reference to that of the variation of lateral trim A2. An input filtering circuit (not shown) may moreover improve still further this selectivity of block 11b. Besides, it is easy to associate with detector 9b an output corrector (not shown) such that the acceleration signal transmitted to block 11b will be directly in proportion to trim A2 and not to its sine, if we want rather high precision for a broad trim range.

According to the theoretical proposition mentioned above, it is seen that integration of the algebraic sum of the values measured by detectors 8b, 9b allow us to get the algebraic value of the velocity component of the helicopter along the reference axis in question, Y1-Y2. Of course, a suitable sign convention is adopted for the algebraic values indicated by the detectors. The behavior of detectors 8a, 9a and integrator block 11a of the other measurement system is absolutely identical with reference to longitudinal axis X1-X2.

Thus each of the crossed bars of double indicator 7 takes into account the algebraic value of the velocity component of the helicopter along one of the reference axes X1-X2 or Y1-Y2, with respect to a zero position located at the center of the dial (FIG. 2). Concentric circles can be supplied on this dial, directly graded as to velocity, on condition or appropriate standardization.

Clearly, the invention affords a number of appreciable advantages.

The invention makes it possible, solely within the helicoptor fuselage, to develop a measurement facility whose various elements are easily seated, using computation organs based on miniaturized electronic circuits and associating with these organs a network of electrical connections as indicated in FIG. 3.

It makes it possible to attain excellent precision in a wide range of speeds and flight conditions. The measurements are independent of the centering and load of the helicopter. Various regulating and resetting means make it possible to adapt the device to helicopters with any configuration and performance, readily to operate in varied conditions.

Of course, the invention is not limited to the embodiment that has been described by way of example, and numberous variants can be supplied without going beyond the scope of the invention. Thus (FIG. 6) particularly on a light helicopter that has no rotor servo commands, it is convenient to dispose the detectors 61a, 61b for control position, analogous to detectors 8a, 8b of FIG. 4, near piloting control column 6, for example on transmission rods 64, 65, acting respectively in the longitudinal and transverse directions.

It is also possible to produce a device according to the invention in very compact form (not illustrated) by grouping directly on column 6 in a single housing all the detectors and computing means, with a simplified indicator. The angular movements of column 6, corresponding to the linear movements of drive rods 4, 5 can be measured directly by a pendular system with two degrees of freedom, provided with suitable damping means if necessary. The same pendular system can take into account the acceleration components along with two axes of reference, longitudinal and transverse, effecting in a summary manner the algebraic additions and integrations described with reference to FIGS. 1, 2 and 5.

A dial with concentric circles like indicator 7 (FIG. 2) can be associated with a mobile index connected to the above mentioned pendular system. This embodiment of the device for measurement according to the invention makes it possible to have a detachable instrument that is readily transported and installed, fixing it for example to the tubular rod of column 6 by means of collars. This instrument may comprise simple adjustment means, made for example by means of sliding wedges or wedging bolts, for its housing.

The precision and reliability of pendular means proposed in the various embodiments that have been described can be improved by associating therewith a gyroscope for verticality. This can have a direct connection, e.g., mechanical, with the pendular means, or be combined with them by means of various systems of remote transmission, possibly provided with devices for correction and amplification.

I CLAIM:

1. In a helicopter having at least one lift rotor and an arrangement for effecting cyclic command of rotor pitch, measurement apparatus for determining the air speed of the helicopter, and indicator means for indicating the determined air speed, said measurement apparatus comprising two substantially identical measurement systems for measuring respectively velocity along the longitudinal and transverse axes of the helicopter, each said measurement system comprising a first detector for detecting the position of the cyclic rotor pitch command member along the corresponding axis and providing a corresponding position signal, a second detector for detecting the acceleration component along the same axis and emitting a corresponding signal, and computing means for receiving said signals and effecting integration of the algebraic sum of the values measured by said first and second detectors for said corresponding axis, said indicator means being operatively associated with said computing means of each said measurement system for indicating measured velocity along said longitudinal and transverse axes.

2. Apparatus as claimed in claim 1 wherein said indicator means comprises a double indicator for indicating said measured velocities separately.

3. Apparatus as claimed in claim 2 wherein each of said detectors includes a measurement potentiometer.

4. Apparatus as claimed in claim 3 wherein said acceleration detectors include pendular levels.

5. Apparatus as claimed in claim 1 wherein said cyclic rotor pitch command members are controlled by a pilot control column, and said position detectors are mounted near said control column for detecting the position of said pitch command members.

6. Apparatus as claimed in claim 1 wherein said cyclic rotor pitch command members are actuated by servo motors, and said position detectors are mounted between the rotor and said servo command members.

7. Apparatus as claimed in claim 1 wherein said helicopter includes automatic pilot means, and further comprises means for selectively connecting said computing means to said automatic pilot for passing command signals to said automatic pilot.

8. Apparatus as claimed in claim 1 wherein at least one of said position detectors includes means for adjusting the detector with reference to a zero position.

9. Apparatus as claimed in claim 1 wherein at least one of said acceleration detectors includes means for adjusting the said acceleration detector with respect to a reference axis.

10. Apparatus as claimed in claim 1 further comprising signal coupling means between the output of said first detector of one of said two measurement systems and the output of the computing means of the other of said two measuring systems for compensating for variation of position of the corresponding cyclic rotor pitch command member of one measurement system under the influence of variation of the velocity component measured by the other measurement system.

* * * * *